(12) United States Patent
Bebawy et al.

(10) Patent No.: US 8,976,885 B2
(45) Date of Patent: Mar. 10, 2015

(54) METHOD AND SYSTEM OF RECEIVER PARAMETRIC COMPUTATION FOR MULTIPLE-INPUT MULTIPLE-OUTPUT (MIMO) TRANSMISSION

(71) Applicant: Telefonaktiebolaget L M Ericsson (Publ), Stockholm (SE)

(72) Inventors: Michael Samuel Bebawy, San Jose, CA (US); Stephen Grant, Pleasanton, CA (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 137 days.

(21) Appl. No.: 13/747,442

(22) Filed: Jan. 22, 2013

(65) Prior Publication Data

US 2014/0204983 A1 Jul. 24, 2014

(51) Int. Cl.
H04B 7/02 (2006.01)
H04B 1/712 (2011.01)
H04B 7/04 (2006.01)

(52) U.S. Cl.
CPC .............. *H04B 1/712* (2013.01); *H04B 7/0413* (2013.01); *H04B 2201/709727* (2013.01)
USPC ........... 375/267; 375/144; 375/148; 375/150; 375/343; 375/346

(58) Field of Classification Search
CPC ................................................ H04L 25/03057
USPC ........................................................ 375/267
See application file for complete search history.

(56) References Cited

U.S. PATENT DOCUMENTS

| 7,957,485 | B2 | 6/2011 | Cairns et al. |
| 8,144,749 | B2 | 3/2012 | Cairns et al. |
| 2006/0251156 | A1 | 11/2006 | Grant et al. |
| 2009/0213944 | A1 | 8/2009 | Grant |
| 2010/0260237 | A1 | 10/2010 | Jonsson |
| 2012/0282936 | A1 | 11/2012 | Gao et al. |

FOREIGN PATENT DOCUMENTS

EP 1898542 3/2008

OTHER PUBLICATIONS

International Search Report, Application No. PCT/IB2014/058471, Apr. 3, 2014, 6 pages.
Notification of Transmittal of the International Search Report and the Written Opinion of the International Searching Authority, Application No. PCT/IB2014/058471, Apr. 3, 2014, 1 page.
(Continued)

*Primary Examiner* — Lihong Yu
(74) *Attorney, Agent, or Firm* — Blakely Sokoloff Taylor & Zafman LLP

(57) ABSTRACT

A method of calculating combining weight vectors associated with a received composite information signal comprising at least one data stream transmitted from at least a first antenna and a second antenna is disclosed. The method starts with computing a parametric estimate of an impairment covariance matrix including at least a first impairment term associated with common pilots deployed by the first antenna and the second antenna respectively. The first impairment term captures effects of interferences between the common pilots, in addition to effects of interferences caused by each common pilot singly. The impairment covariance matrix further includes a data covariance term capturing effects of the at least one data stream and an interference term caused at least partially by contribution of thermal noise of receiver branches. Then the method computes the combining weight vector using the computed impairment covariance matrix.

14 Claims, 10 Drawing Sheets

(56) References Cited

OTHER PUBLICATIONS

Written Opinion of the International Searching Authority, Application No. PCT/IB2014/058471, Apr. 3, 2014, 24 pages.
Gregory E. Bottomley, et al., "A Generalized RAKE Receiver for Interference Suppression", IEEE Journal on Selected Areas in Communications, vol. 18, No. 8, Aug. 2000, 10 pages.
ETSI TS 125 212 V9.2.0 (Mar. 2010) Technical Specification, Universal Mobile Telecommunications System (UMTS); Multiplexing and channel coding (FDD) (3GPP TS 25.212 version 9.2.0 Release 9), Mar. 2010, 110 pages.
3GPP TS 36.211 V10.3.0 (Sep. 2011) Technical Specification, 3rd Generation Partnership Project; Technical Specification Group Radio Access Network; Evolved Universal Terrestrial Radio Access (E-UTRA); Physical Channels and Modulation (Release 10), Sep. 2011, 103 pages.

METHOD AND SYSTEM OF RECEIVER PARAMETRIC COMPUTATION FOR MULTIPLE-INPUT MULTIPLE-OUTPUT (MIMO) TRANSMISSION

FIELD

The embodiments of the invention are related to the field of multiple-input multiple-output (MIMO) system. More specifically, the embodiments of the invention relate to a method and system to perform generalized rake (G-Rake) demodulation for a multi-branch MIMO system.

BACKGROUND

Spread-spectrum communication systems are well known and widely deployed. One class of spread-spectrum communication systems combines multiple antenna transmission techniques with advanced signal processing algorithms to create "smart antenna" using multi-input multi-output (MIMO) technology. MIMO technology may offer significant increases in data throughput and link range without additional bandwidth or increased transmit power by spreading the same total transmit power over the antennas to achieve an array gain that improves the spectral efficiency or to achieve a diversity gain that improves the link reliability. Because of its technical advantages, MIMO technology has become an important part of wireless communication standards such as IEEE 802.11n (Wi-Fi), the fourth generation mobile (4G), the $3^{rd}$ Generation Partnership Project Long Term Evolution (3GPP LTE), worldwide interoperability for Microwave Access (WiMAX), and evolved high-speed packet access (HSPA+).

An N×M MIMO system utilizes N transmit antennas and M receiver antennas. The system may transmit up to N streams of data, each precoded with a length N precoding vector. At the receiver, a G-rake receiver may be used for demodulation transmitted streams. The Rake receiver derives its name from its rake-like structure, where multiple receiver "fingers" are used to receive multiple signal images in a received multipath signal. By coherently combining the finger outputs in a weighted Rake combiner, a conventional Rake receiver can use multipath reception to improve the Signal to Interference-plus-Noise Ratio (SINR) of the received signal. A Generalized Rake (G-Rake) receiver improves interference suppression performance over a conventional Rake receiver using more sophisticated generation of the combining weights.

A MIMO system utilizes pilots in its transmission of data streams. Three types of pilots are known in MIMO technology, and they are dedicated pilots, common pilots, and scheduled common pilots.

Dedicated pilots are precoded or beam-formed with data transmitted. Precoding may be done through coding with a vector and beam-forming may be performed through combining elements in a phased array so that signals at particular angles experience constructive combination while others experience destructive combination. Dedicated pilots may be used for precoded data demodulation when explicit precoder information is not included in control signaling. The advantage of dedicated pilot is that it can support high number of physical transmitting antennas.

Common pilots are pilots that are not precoded or beam-formed. Common pilots are generally used for 1) control channel demodulation, 2) non-precoded data demodulation, 3) downlink precoded data demodulation with explicit precoder information included in control signaling, and 4) channel quality indication (CQI) and MIMO channel measurement. Because channel estimation using common pilots does not need to be confined within a resource block, channel estimation performance can be improved with lower pilot density compared to dedicated pilots. Common pilots and dedicated pilots are not mutually exclusive. For example, in one MIMO system, common pilots may be used for CQI measurement and dedicated pilots may be used for MIMO channel measurement.

In addition, scheduled common pilots may be deployed in a MIMO system. Schedule common pilots are common pilots deployed in a branch only when the branch is utilized. For example, in a 4×4 MIMO system, common pilots may be used for CQI measurement. Additionally, for demodulation purposes, two additional common pilots are utilized whenever a four-branch user equipment (UE) is scheduled. That is, common pilots are used for CQI measurement while scheduled common pilots are used for data demodulation. The main objective of these additional pilots is to improve the performance of channel estimation (by transmitting at high power) while at the same time not transmitting these pilots all the time. At higher level, the scheduled pilots has the potential of achieving good performance of four-branch MIMO UE, while at the same time reduce the interference to other legacy users.

For demodulation, while prior art has explored inter-stream interference relating to multiple pilots in certain scenario within a 2×2 MIMO system, the accuracy of impairment covariance estimation has room for improvement with regard to common pilots. For 4×4 or higher dimension MIMO systems, an effective and accurate estimation of interference caused by dedicated pilots and scheduled common pilots is needed.

SUMMARY

A method of calculating combining weight vectors associated with a received composite information signal comprising at least one data stream transmitted from at least a first antenna and a second antenna is disclosed. The method starts with computing a parametric estimate of an impairment covariance matrix including at least a first impairment term associated with common pilots deployed by the first antenna and the second antenna respectively. The first impairment term captures effects of interferences between the common pilots, in addition to effects of interferences caused by each common pilot singly. The impairment covariance matrix further includes a data covariance term capturing effects of the at least one data stream and an interference term caused at least partially by contribution of thermal noise of receiver branches. Then the method computes a combining weight vector using the computed impairment covariance matrix and computing the combining weight vector includes a matrix update no higher than rank-one.

A method of calculating combining weight vectors associated with a received composite information signal comprising at least one data stream transmitted from at least a first antenna, a second antenna, a third antenna, and a fourth antenna is disclosed. The method starts with computing a parametric estimate of an impairment covariance matrix including at least a first impairment term associated with common pilots deployed by the first antenna, the second antenna, the third antenna, and the fourth antenna respectively, where the common pilots are pilots without being precoded or beam-formed, where the first impairment term captures effects of interferences of the common pilots, and where the computed impairment covariance matrix further includes a data covariance term capturing effects of the at least one data stream and an interference term caused at least partially by contribution of thermal noise of receiver branches. The method further computes the impairment covariance matrix including a second impairment term associated with at least one dedicated pilot, where the dedicated pilot is a pilot being precoded or beam-formed, and where the second impairment term captures effects of interferences caused by the at least one dedicated pilot. Then the method computes a combining weight vector using the computed impairment covariance matrix and computing the combining weight vector includes a matrix update no higher than rank-one.

A method of calculating combining weight vectors associated with a received composite information signal comprising at least one data stream transmitted from at least a first antenna, a second antenna, a third antenna, and a fourth antenna is disclosed. The method starts with computing a parametric estimate of an impairment covariance matrix including at least a first impairment term associated with common pilots deployed by the first antenna, the second antenna, the third antenna, and the fourth antenna respectively, where the common pilots are pilots without being precoded or beam-formed, where the first impairment term captures effects of interferences of the common pilots, and where the computed impairment covariance matrix further includes a data covariance term capturing effects of the at least one data stream and an interference term caused at least partially by contribution of thermal noise of receiver branches. The method further computes the impairment covariance matrix including a second impairment term associated with at least a first scheduled common pilot and a second scheduled common pilot associated with the third antenna and the fourth antenna respectively, where the additional scheduled common pilots being deployed only when the at least one data stream is scheduled to be transmitted to a user equipment (UE) supporting demodulation of the signals on at least the additional third and fourth antenna, and where the second impairment term captures effects of interferences caused by the additional scheduled common pilots. Then the method computes a combining weight vector using the computed impairment covariance matrix and computing the combining weight vector includes a matrix update no higher than rank-one.

A method of calculating combining weight vectors associated with a received composite information signal comprising at least one data stream transmitted from at least a first antenna, a second antenna, a third antenna, and a fourth antenna is disclosed. The method starts with computing a parametric estimate of an impairment covariance matrix including at least a first impairment term associated with common pilots deployed by the first antenna, the second antenna, the third antenna, and the fourth antenna respectively, where the common pilots are pilots without being precoded or beam-formed, where the first impairment term captures effects of interferences of the common pilots, and where the computed impairment covariance matrix further includes a data covariance term capturing effects of the at least one data stream and an interference term caused at least partially by contribution of thermal noise of receiver branches. Then the method computes a combining weight vector using the computed impairment covariance matrix and computing the combining weight vector includes a matrix update no higher than rank-one.

A network device configured to perform as a wireless communication receiver in a network is disclosed. The network device includes a radio front-end circuit configured to receive a composite information signal, the composite information signal comprising at least one data stream transmitted from at least a first antenna and a second antenna. The network device further includes a covariance estimation module configured to compute a parametric estimate of an impairment covariance matrix including at least a first impairment term associated with common pilots deployed by the first antenna and the second antenna respectively, where the common pilots are pilots without being precoded or beam-formed, where the first impairment term capture effects of interferences between the common pilots, in addition to effects of interferences caused by each common pilot singly, and where the computed impairment covariance matrix further includes a data covariance term capturing effects of the at least one data stream and an interference term caused at least partially by contribution of thermal noise of receiver branches. In addition, the network device includes a combining weight vector computation module configured to compute a combining weight vector using the computed impairment covariance matrix and computing the combining weight vector includes a matrix update no higher than rank-one.

A network device configured to perform as a wireless communication receiver in a network is disclosed. The network device includes a radio front-end circuit configured to receive a composite information signal, the composite information signal comprising at least one data stream transmitted from at least a first antenna, a second antenna, a third antenna, and a fourth antenna. The network device further includes a covariance estimation module configured to compute a parametric estimate of an impairment covariance matrix including at least a first impairment term associated with common pilots deployed by the first antenna, the second antenna, the third antenna, and the fourth antenna respectively, where the common pilots are pilots without being precoded or beam-formed, where the first impairment term captures effects of interferences of the common pilots, where the computed impairment covariance matrix further includes a second impairment term associated with at least one dedicated pilot, where the at least one dedicated pilot is a pilot being precoded or beam-formed, and where the second impairment term captures effects of interferences caused by the at least one dedicated pilot. In addition, the network device includes a combining weight vector computation module configured to compute a combining weight vector using the computed impairment covariance matrix and computing the combining weight vector includes a matrix update no higher than rank-one.

A network device configured to perform as a wireless communication receiver in a network is disclosed. The network device includes a radio front-end circuit configured to receive a composite information signal, the composite information signal comprising at least one data stream transmitted from at least a first antenna, a second antenna, a third antenna, and a fourth antenna. The network device further includes a covariance estimation module configured to compute a parametric estimate of an impairment covariance matrix including at least a first impairment term associated with common pilots deployed by the first antenna, the second antenna, the third antenna, and the fourth antenna respectively, where the common pilots are pilots without being precoded or beam-formed, where the first impairment term captures effects of interferences of the common pilots, where the computed impairment covariance matrix further includes a second impairment term associated with at least a first scheduled common pilot and a second scheduled common pilot associated with the third antenna and the fourth antenna respectively, where the additional scheduled common pilots being deployed only when the at least one data stream is scheduled to be transmitted to a user equipment (UE) supporting demodulation of the signals on at least the additional third and fourth antenna, and where the second impairment term captures effects of interferences caused by the additional scheduled common pilots. In addition, the network device includes a combining weight vector computation module configured to compute a combining weight vector using the computed impairment covariance matrix and computing the combining weight vector includes a matrix update no higher than rank-one.

A network device configured to perform as a wireless communication receiver in a network is disclosed. The network device includes a radio front-end circuit configured to receive a composite information signal, the composite information signal comprising at least one data stream transmitted from at least a first antenna, a second antenna, a third antenna, and a fourth antenna. The network device further includes a covariance estimation module configured to compute a parametric estimate of an impairment covariance matrix including at least a first impairment term associated with common pilots deployed by the first antenna, the second antenna, the third antenna, and the fourth antenna respectively, where the common pilots are pilots without being precoded or beam-formed, where the first impairment term capture effects of interferences of the common pilots, and where the computed impairment covariance matrix further includes a data covariance term capture effects of the at least one data stream and an interference term caused at least partially by contribution of thermal noise of receiver branches. In addition, the network device includes a combining weight vector computation module configured to compute a combining weight vector using the computed impairment covariance matrix, where computing the combining weight vector includes a matrix update no higher than rank-one.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to affect such feature, structure, or characteristic in connection with other embodiments whether or not explicitly described.

DETAILED DESCRIPTION

Figure 1:
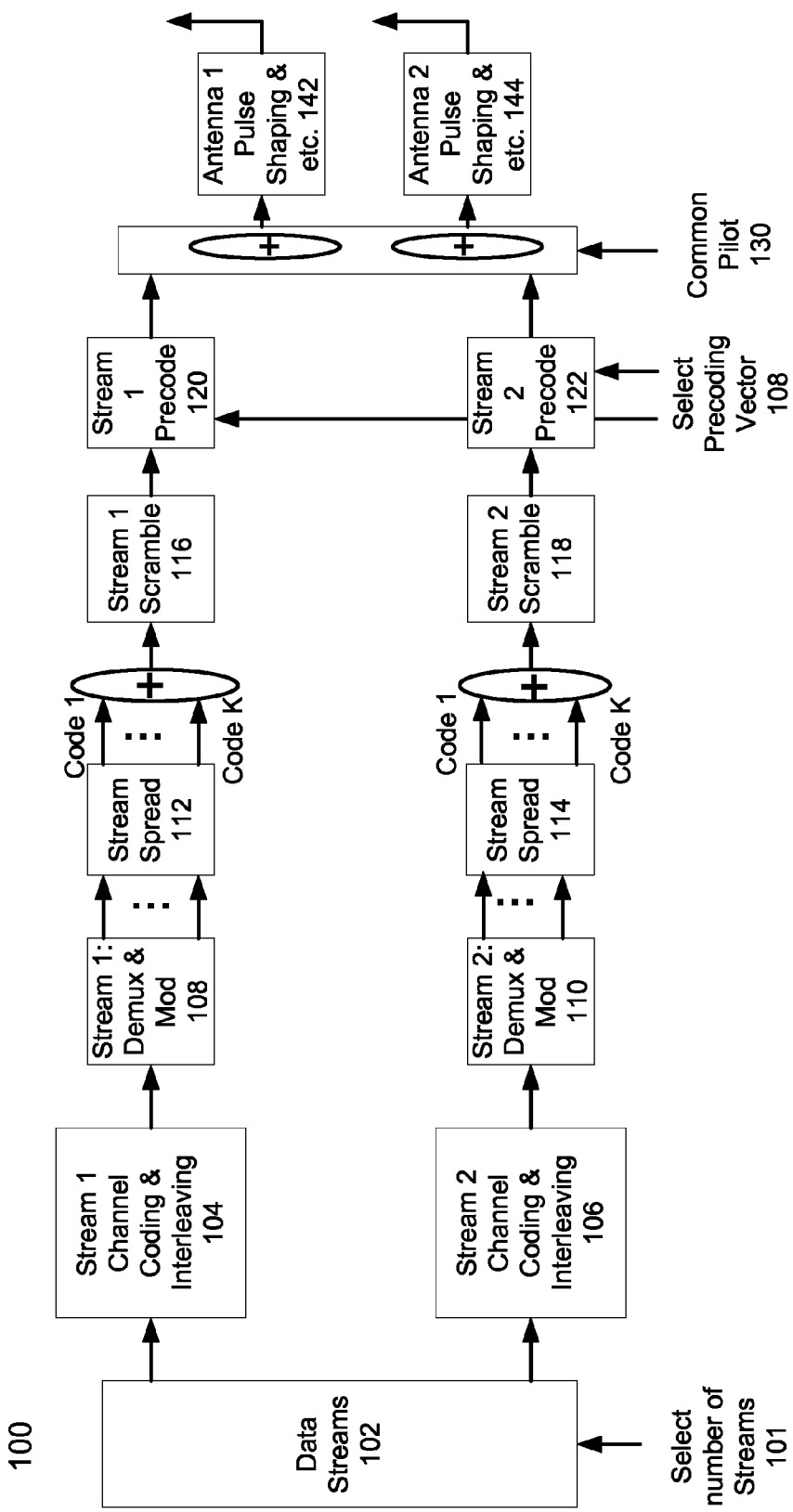
FIG. 1 is a block diagram illustrating a two-antenna MIMO transmitting system according to one embodiment of the invention.

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art that the invention may be practiced without such specific details. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The operations of the flow diagram will be described with reference to the exemplary embodiment of FIGS. 1, 2, 3, and 8. However, it should be understood that the operations of flow diagrams can be performed by embodiments of the invention other than those discussed with reference to FIGS. 4-6, 9 and 10, and the embodiments discussed with reference to 1, 2, 3, and 8 can perform operations different than those discussed with reference to the flow diagrams of FIGS. 4-6, 9 and 10.

As used herein, a network device (e.g., a wireless transmitter or a receiver) is a piece of networking equipment, including hardware and software that communicatively interconnects other equipment on the network (e.g., other network devices, end systems). Some network devices are "multiple services network devices" that provide support for multiple networking functions (e.g., routing, bridging, VLAN (virtual LAN) switching, Layer 2 aggregation, session border control, Quality of Service, and/or subscriber management), and/or provide support for multiple application services (e.g., data, voice, and video).

Embodiments of System Configurations

A MIMO system used in a wireless network includes a transmitting system and a receiving system, each containing multiple antennas. The transmitting system may be implemented in a wireless base station, which is often installed at a fixed location and used to communicate with numerous mobile subscriber end systems.

The receiving system may be installed in a mobile subscriber end system of the wireless network. The mobile subscriber end system is often referred to as user equipment (UE). An UE may be a phone (e.g., a mobile phone, a smartphone, a multimedia phone, and a Voice Over Internet Protocol (VOIP) phone), but it can also be a server, a workstation, a laptop, a netbook, a palm top, a terminal, a portable media player, a GPS unit, a gaming system, or a set-top box, when these devices have wireless access. An UE communicates with a wireless base station through a MIMO system to access content/services provided over the Internet or a telephony network.

FIG. 1 is a block diagram illustrating a two-antenna MIMO transmitting system according to one embodiment of the invention. The MIMO transmitting system 100 accepts a selected number of streams 101 at data streams module 102. The streams are split into two as system 100 has two antennas. In each stream, the data goes through channel coding & interleaving modules (references 104 and 106), then demuplexation and modulation modules (references 108 and 110). The data streams are processed through stream spread modules (references 112 and 114) to spread over a bank of K spreader using codes 1 to K at stream spreader modules 112 and 114 respectively. The two streams are then scrambled (at stream scramble modules 116 and 118 respectively) and pre-coded (at stream precode modules 120 and 122) through selecting precoding vectors at reference 108. Then common pilots are applied at reference 130 and data streams are transmitted to an UE through antenna pulse shaping modules for antenna one and two at references 142 and 144 respectively. After transmission, feedback signals are received from the UE to determine the channel rank (number of data streams), the modulation and coding scheme (MCS) of each stream and the precoding vector of each stream to be used in subsequent transmissions. Note that some operations (such as rate matching and frame segmentation) and modules not essential to embodiments of the inventions are ignored in the figure. Also note that for a two-antenna transmitting system, only common pilots are needed for modulation.

Figure 2:
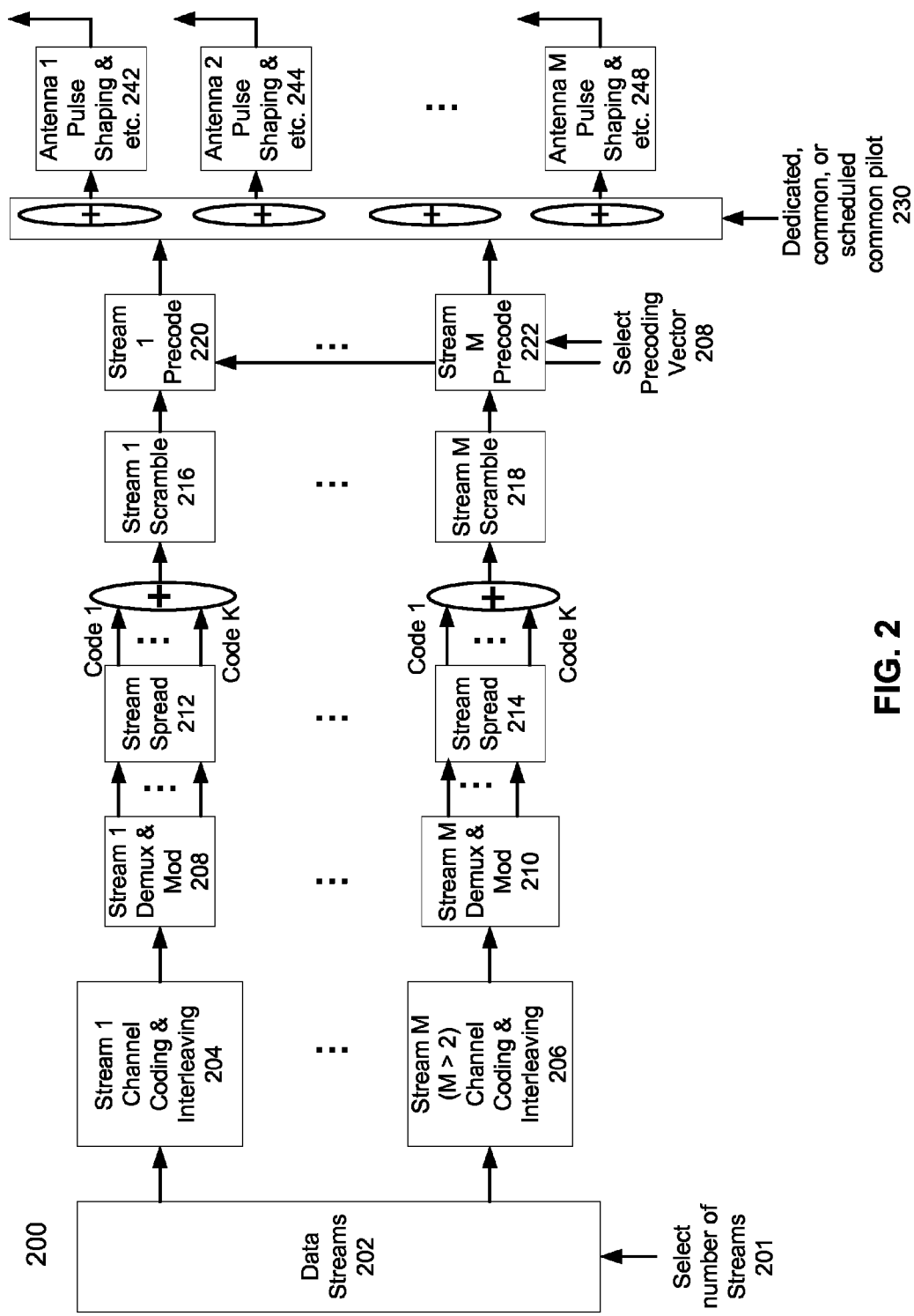
FIG. 2 is a block diagram illustrating another MIMO transmitting system according to one embodiment of the invention.

FIG. 2 is a block diagram illustrating another MIMO transmitting system according to one embodiment of the invention. FIG. 2 is similar to FIG. 1 and the same or similar references indicate elements or components having the same or similar functionalities. The main difference is that MIMO transmitting system 200 contains M transmitting antennas where M is larger than two. Common implementation includes four or eight transmitting antennas. In addition, because of the additional antennas, a variety of additional pilots may be deployed for transmitting data streams. As shown at reference 230, the selected pilots may be dedicated, common, or scheduled common pilots. For example, for a four-antenna transmitting system, common pilots may be selected for all four antennas and scheduled or shared common pilots may be additionally deployed for the third and fourth antennas.

Figure 3:
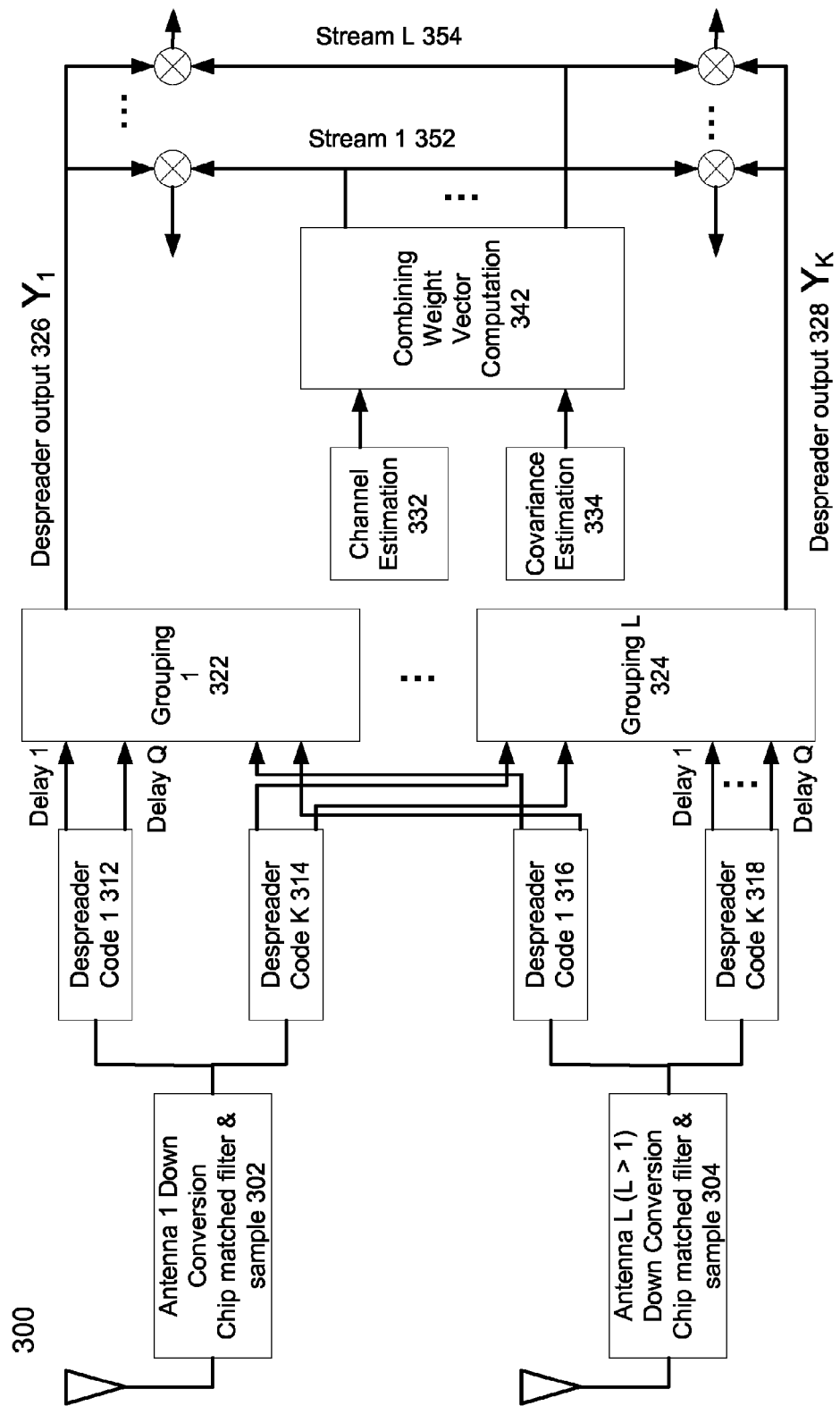
FIG. 3 is a block diagram illustrating a MIMO receiving system according to one embodiment of the invention.

FIG. 3 is a block diagram illustrating a MIMO receiving system according to one embodiment of the invention. MIMO receiving system 300 contains L receiving antennas where L is larger than one. MIMO receiving system 300 typically contain two, four, or eight receiving antennas. Transmitted signal from a transmitter is received at antennas one to L, and they are processed at radio front-end circuits 302 to 304. The signals are then processed through a bank of K despreaders at references 312 to 314 or 316 to 318 depending on the streams. Then the signals are delayed with value 1 to Q with Q being the number of fingers. The delayed signals are then grouped again at groups 1 to L (references 322 and 324 respectively). The despread signals are $Y_1$ to $Y_k$, where k is the $k^{th}$ channelization code. The demodulation is performed through channel estimation module 332 and covariance estimation module 334. Channel estimation module 332 computes estimation of the transmission channels incoming signals transmitted through. Covariance estimation module 334 computes impairment covariance for various data streams, pilots, and noises. The estimates are then fed to combining weight vector computation module 342, where combining weight vectors are computed. The computed combining weight vectors then are used to demodulate various streams and the receiver system 300 restores transmitted signals. Similarly with transmitting system 100 of FIG. 1, in FIG. 3, some operations (e.g., frequency down conversion to the baseband, chip matched filtering, and sampling) and modules not essential to the invention are ignored.

Computations of Parametric Estimations for G-Rake MIMO Receiving Systems

For demodulation, a MIMO receiving system may use a non-parametric approach for impairment covariance estimation where samples of the impairment processes are obtained, e.g., by taking samples of the pilot despreader outputs and subtracting off the known signal term leaving the impairment. Then the system computes the sample covariance by averaging the outer product of many impairment vector samples. The non-parametric approach has been disclosed in U.S. Pat. No. 8,144,749, entitled "Non-parametric MIMO G-Rake Receiver" by Douglas Cairns, Elias Jonsson, Anders Rosenqvist, Andres Reial, and Stephen Grant. Alternatively, the MIMO receiving system may use a parametric approach, and construct an impairment model to compute the impairment covariance matrix using estimates for all variables in the formulas, e.g., channel estimates, energy scaling parameters, noise variance, etc. In the parametric approach, the system relies on a parameterized model for the impairment and computes a parametric estimate of the impairment covariance according to the model. In this specification, unless noted otherwise, all computations of the covariance matrix utilize the parametric approach.

For a wireless receiver like MIMO receiving system 300, the output of despreaders may be expressed as the following:

$$y = \underline{H_{\mathit{eff}} \cdot c} + u \qquad (1)$$

Within the formula, c is the desired data symbol vector transmitted, $H_{\mathit{eff}}$ is the effective result of all operations performed on the desired data symbol by MIMO transmitting system and receiving system prior to despreading. $H_{\mathit{eff}}$ is referred to as the effective channel response matrix herein below. The second term on the right hand side (RHS) of formula (1), u, is the combination of impairment experienced by the desired data symbol vector.

In one embodiment, the output of despreaders at a G-Rake receiver with code k at time i may be expressed as the following:

$$y_k(i) = \underbrace{H \cdot B \cdot A \cdot c_k(i)}_{\text{Desired multicode } k} + u_k(i) \quad (2)$$

The length of $y_k(i)$ is $L \cdot Q$, where L is the number of receiving antennas and Q is the number of G-Rake fingers per antenna. The first term on the RHS of (2) is the result of operation through desired multcode k. H is a channel response matrix, B is a precoding matrix with dimension M×S, where M is the number of transmit antennas and S is the number of precoded data stream. The precoding vector of data stream s (denoted by $b_s$) for s=1, ..., S, is the $s^{th}$ column of B. The rows of B are denoted by $u_m^T$, m=1, ..., M. In other words, B can be expressed as:

$$B = [b_1, \ldots, b_S] = \begin{bmatrix} u_1^T \\ \vdots \\ u_M^T \end{bmatrix} \quad (3)$$

A is a diagonal matrix defined as:

$$A = \begin{bmatrix} \sqrt{\alpha(1)} & & \\ & \ddots & \\ & & \sqrt{\alpha(S)} \end{bmatrix} \quad (4)$$

In formula (4), $\alpha(s)$ is the symbol energy/channelization code of the $s^{th}$ stream. Each $\alpha(s)$ is defined in terms of other system parameters. Denoting N being the spreading factor of the data characterization codes, K the number of data channelization codes, $E_s$ the total chip energy allocated to data, and $\gamma(s)$ the fraction of the data chip energy allocated to stream s, then $\alpha(s)$ is given by:

$$\alpha(s) = \frac{N \cdot E_S \cdot \gamma(s)}{K} \quad (5)$$

The diagonal matrices $A_c = \text{diag}(\sqrt{\eta_1}, \ldots, \sqrt{\eta_M})$, $A_d$ and $A_s = \text{diag}(\sqrt{\mu_1}, \ldots, \sqrt{\mu_M})$ are similar to A except that they carry on their diagonals the amplitudes (square roots of the powers) of the common, dedicated and scheduled common pilots respectively rather than data. $A_c$ and $A_s$ have dimensions M×M and $A_d$ has dimensions S×S. This is because common and scheduled common pilots are attached to the transmit antennas but the dedicated pilots are attached to the number of data streams. Moreover, some of the diagonal entries of $A_s$, $\sqrt{\mu_m}$, may be zero because the scheduled common pilots may not be transmitted from all transmit antennas. The computation of the diagonal entries of $A_c$, $A_d$, and $A_s$ is done at the Node B or signaled to it by the radio network controller (RNC) and the computation is known in the art.

The last item of the first term of the RHS of formula (2) is $c_k(i)$, and it is the desired data symbol vector transmitted on the $k^{th}$ channelization code at time i. $c_k(i)$ has length S. The G-Rake demodulator computes soft values for the bits constituting $c_k(i)$ given the despreader output $y_k(i)$.

The second term of the RHS of formula (2) is the impairment $u_k(i)$ seen by the despreaders output $y_k(i)$, and it may be defined as:

$$u_k(i) = \underbrace{\tilde{H}_{k,k,0}(i) \cdot B \cdot A \cdot c_k(i)}_{\substack{\text{Code-specific interference} \\ \text{of code } k \text{ at time } 0.}} + \underbrace{\sum_{\substack{j=-\infty \\ j \neq 0}}^{\infty} H_{k,k,j}(i) \cdot B \cdot A \cdot c_k(i-j)}_{\text{ISI of code } k} + \quad (6)$$

$$\underbrace{\sum_{j=-\infty}^{\infty} \left( \sum_{\substack{k_1=1 \\ k_1 \neq k}}^{K} H_{k,k_1,j}(i) \cdot B \cdot A \cdot c_{k_1}(i-j) \right)}_{\text{MUI from other channelization codes}} +$$

$$\underbrace{\sum_{j=-\infty}^{\infty} H_{k,K+1,j}(i) \cdot (A_c \cdot p(i-j) + Z(i,j))}_{\text{Overhead due to pilots}} + \underbrace{n_k(i)}_{\substack{\text{Thermal} \\ \text{noise +} \\ \text{other-cell} \\ \text{interference}}}$$

$H_{k,k_1,j}(i)$ is a channel response matrix with dimensions $L \cdot Q \times M$. They account for the interference superposed by $c_{k_1}(i-j)$ on the desired data $c_k(i)$, where j is the symbol lag. When $k_1=k$ and j=0, we get the net channel response matrix of the desired data component, $H_{k,k,0}(i)$. Furthermore, each of the matrices can be expressed as the sum of two parts:

$$H_{k,k_1,j}(i) = \bar{H}_{k,k_1,j}(i) + \tilde{H}_{k,k_1,j}(i) \quad (7)$$

$\bar{H}_{k,k_1,j}(i)$ is called the code-averaged component (or the mean) of $H_{k,k_1,j}(i)$ and $\tilde{H}_{k,k_1,j}(i)$ is its code-specific component. For the intersymbol interference (ISI) and multiuser interference (MUI) terms ($k_1 \neq k$ and/or $j \neq 0$), it can be shown that $\bar{H}_{k,k_1,j}(i)=0$ so that formula (6) simplifies to $H_{k,k_1,j}(i) = \tilde{H}_{k,k_1,j}(i)$. On the other hand, for the desired data $c_k(i)$, the code-averaged component is non-zero and we denote it by H, i.e., $$\bar{H}_{k,k_1,j}(i) \triangleq \begin{cases} H & k_1 = k \text{ and } j = 0, \\ 0 & \text{otherwise.} \end{cases} \quad (8)$$

As known by those skilled in the art, it costs a significant amount of hardware complexity to compute the code-specific components $\tilde{H}_{k,k_1,j}(i)$ whether for the desired data $c_k(i)$ ($k_1=k$ and j=0) or for the ISI/MUI. Hence, the G-Rake receiver may perform two simplifying steps:

(a) The G-Rake receiver may uses H instead of $H_{k,k,0}(i)$ in formula (2) and includes the code-specific term, $\tilde{H}_{k,k,0}(i)$, in the impairment together with the intersymbol interference (ISI) and multiuser interference (MUI) as illustrated as the first term on the RHS of formula (6).

(b) The impairment covariance is derived through computing an expectation value:

$$R_k(i) \triangleq E[u_k(i) \cdot u_k(i)^\dagger] \quad (9)$$

In formula (9), $u_k(i)^\dagger$ is the conjugate transpose of $u_k(i)$ and the impairment $u_k(i)$ has zero-mean (note symbol "†" in this specification denotes conjugate transpose). In addition, the scrambling code is assumed to be unknown. Hence, the expectation is not only taken over the data symbols $c_{k_1}(i-j)$ and the noise $n_k(i)$, but also over the ensemble of scrambling codes. This will result in a code-averaged covariance matrix, i.e., one that is independent of the instantaneous value of the scrambling code.

Referring back to formula (6), the term Z(i,j) depends on whether dedicated or scheduled common pilots are used and is defined as:

$$Z(i, j) = \begin{cases} B \cdot A_d \cdot d(i-j) & \text{when dedicated pilots are used,} \\ A_s \cdot p_s(i-j) & \text{when scheduled common pilots are used.} \end{cases} \quad (10)$$

The code tree from which the channelization codes are taken may be assumed containing K+1 codes, for example at space frequency N=16. Codes from 1 to K are used for data transmission. Spreading code (K+1) is pushed forward to depth $N_c$=256 in order to obtain the spreading codes of the common and dedicated pilots. Due to the nature of Hadamard sequences, the cross correlation between the desired data code k and any N-chip period of the common, the dedicated or the scheduled common pilot codes at any specific lag is the same except for a possible sign change. If these sign changes are absorbed into the common, dedicated or scheduled common pilots $p(i-j) \triangleq [p_1(i-j), \ldots, p_M(i-j)]^T$, $d(i-j) \triangleq [d_1(i-j), \ldots d_s(i-j)]^T$, and $p_s(i-j) \triangleq [q_1(i-j), \ldots, q_M(i-j)]^T$ respectively, then the response matrices for all the pilots become the same and are denoted by $H_{k,K+1,j}(i)$.

Referring back to formula (6), each term on the RHS is denoted with an explanation. All have been discussed herein above except the last term, $u_k(i)$, which is thermal noise of receiver branches and other cellular interference that the desired data $c_k(i)$ experienced through transmission.

Based on discussion around formulas (7) (10), formula (6) can be expressed more compactly as the following:

$$u_k(i) = \sum_{j=-J}^{J} \sum_{k_1=1}^{K} \tilde{H}_{k,k_1,j}(i) \cdot B \cdot A \cdot c_{k_1}(i-j) + \sum_{j=-J}^{J} \tilde{H}_{k,K+1,j}(i) \cdot [A_c \cdot p(i-j) + Z(i-j)] + n_k(i) \quad (11)$$

The response matrices $H_{k,K+1,j}(i)$ may be further expressed as the following to deduce a parametric expression of the impairment covariance:

$$H_{k,k_1,j}(i) = \left[ h_{1,j}^{(k,k_1)}(i) \ \ldots \ h_{M,j}^{(k,k_1)}(i) \right] = \begin{bmatrix} h_{1,1,j}^{(k,k_1)}(i) & \ldots & h_{M,1,j}^{(k,k_1)}(i) \\ \vdots & \ddots & \vdots \\ h_{1,L,j}^{(k,k_1)}(i) & \ldots & h_{M,L,j}^{(k,k_1)}(i) \end{bmatrix} \quad (12)$$

In formula (12), $h_{m,j}^{(k,k_1)}(i)$ has length L·Q and corresponds to transmit antenna m. $h_{m,j}^{(k,k_1)}(i)$ consists of L parts: $h_{m,1,j}^{(k,k_1)}(i)$ through $h_{m,L,j}^{(k,k_1)}(i)$ as shown. The $n^{th}$ entry of $h_{m,l,j}^{(k,k_1)}(i)$ is defined as:

$$\left[ h_{m,l,j}^{(k,k_1)}(i) \right]_n = \frac{1}{N} \sum_{p=1}^{P} g_{m,l,p} \sum_{u=1-N}^{N-1} C_{k,k_1,i,j}(u) \cdot x(jT + \tau_n - \tau_{m,l,p} - uT_c) \quad (13)$$

In formula (13), $g_{m,l,p}$ is the channel gain between transmit antenna m and receive antenna l on multipath p. P is the total number of multipaths. The definitions of the code cross-correlation function $C_{k,k_1,i,j}(u)$ and the raised-cosine autocorrelation function $x(t)$ are known in the art but since a G-Rake demodulator averages over the ensemble of scrambling codes, the hard-to-compute $C_{k,k_1,i,j}(u)$ disappears for the expressions of the net response and the covariance matrix and is replaced by functions that are much simpler to compute or may not even depend on i. Hence, they are computed less frequently than the symbol rate, bringing the computational complexity down to a manageable level.

With various terms are computed regarding to $u_k(i)$, formula (9) above can be utilized to calculate the impairment matrix for the $k^{th}$ channelization code at time i. As discussed herein above, the impairment matrix is used in computing the combining vectors of different data stream (e.g., through combining weight vector computation module 342 of FIG. 3). $R_k(i)$ may be obtained by computing formula (9) above and expressed as the following:

$$R_k(i) = R_n + \sum_{m_1=1}^{M} \sum_{m_2=1}^{M} G_{m_1,m_2}^{(1)}(i) + G_{m_1,m_2}^{(2)}(i) + G_{m_1,m_2}^{(3)}(i) \quad (14)$$

In formula (14), matrix $R_n$ represents the contribution of thermal noise and other-cell interference. The second term in the summation on the right-hand side of formula (14) represents the data part of the covariance matrix (referred to as the "data covariance term" herein below). The third term represents the effect of the common pilots and the last term represents either the dedicated pilots or the scheduled common pilots. The data covariance term, common pilots term, and the dedicated pilots/scheduled common pilots term are defined as the following respectively:

$$G_{m_1,m_2}^{(1)}(i) \triangleq \left( u_{m_1}^T \cdot A^2 \cdot u_{m_2}^* \right) \cdot \sum_{k_1=1}^{K} \sum_{j=-\infty}^{\infty} E\left[ \tilde{h}_{m_1,j}^{(k,k_1)}(i) \cdot \tilde{h}_{m_2,j}^{(k,k_1)}(i)^\dagger \right] \quad (15a)$$

$$G_{m_1,m_2}^{(2)}(i) \triangleq \quad (15b)$$

$$\sqrt{\eta_{m_1} \cdot \eta_{m_2}} \cdot \sum_{j=-\infty}^{\infty} p_{m_1}(i-j) \cdot p_{m_2}^*(i-j) \cdot E\left[ \tilde{h}_{m_1,j}^{(k,K+1)}(i) \cdot \tilde{h}_{m_2,j}^{(k,K+1)}(i)^\dagger \right]$$

$$G_{m_1,m_2}^{(3)}(i) \triangleq \begin{cases} \sum_{j=-\infty}^{\infty} u_{m_1}^T \cdot A_d \cdot [d(i-j) \cdot d(i-j)^\dagger] \cdot \\ A_d^\top \cdot u_{m_2} \cdot E\left[ \tilde{h}_{m_1,j}^{(k,K+1)}(i) \cdot \tilde{h}_{m_2,j}^{(k,K+1)}(i)^\dagger \right] \\ \sqrt{\mu_{m_1} \cdot \mu_{m_2}} \sum_{j=-\infty}^{\infty} q_{m_1}(i-j) \cdot q_{m_2}^*(i-j) \cdot \\ E\left[ \tilde{h}_{m_1,j}^{(k,K+1)}(i) \cdot \tilde{h}_{m_2,j}^{(k,K+1)}(i)^\dagger \right] \end{cases} \quad (15c)$$

In formulating a parametric expression for the covariance matrix, it is known in the art that thermal noise term $R_n$, as well as the data components, $G_{m_1,m_2}^{(1)}(i)$, defined in (15a), can be manipulated mathematically in order to obtain a closed-form expression for the $(n_1, n_2)^{th}$ entry of its $(l_1, l_2)^{th}$ block as the following:

$$\left[ G_{m_1,m_2}^{(1)}(i) \right]_{l_1,l_2,n_1,n_2} = \frac{K}{N} \left( u_{m_1}^\top \cdot A^2 \cdot u_{m_2} \right) \cdot \sum_{p_1=1}^{P} \sum_{p_2=1}^{P} g_{m_1,l_1,p_1} \cdot g_{m_2,l_2,p_2}^* \quad (16)$$

$$\sum_{\substack{u=-\infty \\ u \neq 0}}^{\infty} x(\tau_{n_1} - \tau_{m_1,l_1,p_1} - uT_c) \times x(\tau_{n_2} - \tau_{m_2,l_2,p_2} - uT_c).$$

Formula (16) is a code-averaged expression having the advantage that it is independent of the symbol time index i which means that it needs to be computed only once per slot or per transmission time interval (TTI).

Embodiments of Improving Computation of Interferences Caused by Common Pilots

With regard to common pilots, the assumption made in the prior art is that the common pilot symbols are unknown to the G-Rake demodulator. Thus, the common pilot components, $G_{m_1,m_2}^{(2)}(i)$, in (15b) is non-zero only for the special case $m_1=m_2$. In this case, the common pilot components $G_{m_1,m_2}^{(2)}(i)$ become independent of the symbol time index i and it is simple to compute. While this approximation might cause a small performance penalty for the case of a smaller MIMO system (e.g., a 2×2 MIMO), the performance penalty in a bigger MIMO system (e.g., a 4×4 or a 8×8 MIMO system) can be more severe since the number of neglected terms is larger.

In one embodiment of the invention, a G-Rake demodulator exploits its knowledge of the common pilot symbols. Thus, the common pilot components, $G_{m_1,m_2}^{(2)}(i)$, has a non-zero value for all $m_1$ and $m_2$, not only for $m_1=m_2$. Based on that, the $(n_1,n_2)^{th}$ entry of the $(l_1,l_2)^{th}$ block of $G_{m_1,m_2}^{(2)}(i)$ can be shown to be the following:

$$[G_{m_1,m_2}^{(2)}(i)]_{l_1,l_2,n_1,n_2} = \quad (17)$$

$$\frac{\sqrt{\eta_{m_1}\eta_{m_2}}}{N} \sum_{p_1=1}^{P} \sum_{p_2=1}^{P} g_{m_1,l_1,p_1} g_{m_2,l_2,p_2}^* \sum_{\substack{u=-\infty \\ u \neq 0}}^{\infty} f_{m_1,m_2}(u;i) \cdot$$

$$x(\tau_{n_1} - \tau_{m_1,l_1,p_1} - uT_c) \times x(\tau_{n_2} - \tau_{m_2,l_2,p_2} - uT_c).$$

In formula (17), scaling function $f_{m_1,m_2}(u;i)$ makes the common pilot component $G_{m_1,m_2}^{(2)}(i)$, time dependent because it depends on the pilot sequence used on every transmit antenna. Fortunately, these pilot sequences are periodic. For example, the pilot sequence repeats every $$\frac{N_c = 256}{N = 16} = 16$$

symbols for the selected N and $N_c$. In one embodiment, for the selected N and $N_c$, $G_{m_1,m_2}^{(2)}(i)$ is evaluated in the first 16 symbol intervals of every slot or every (several) TTIs and stored for subsequent use. In other words, even though $G_{m_1,m_2}^{(2)}(i)$ is time-dependent, it does not have to be computed every symbol interval (160 times/slot). It has to be computed only 16 times per slot. The function $f_{m_1,m_2}(u;i)$ is given by:

$$f_{m_1,m_2}(u;i) = p_{m_1}\left(i - \left\lfloor \frac{u}{N} \right\rfloor\right) \cdot p_{m_2}^*\left(i - \left\lfloor \frac{u}{N} \right\rfloor\right) \cdot \left(1 - \frac{u \bmod N}{N}\right) + \quad (18)$$

$$p_{m_1}\left(i - \left\lfloor \frac{u}{N} \right\rfloor - 1\right) \times p_{m_2}^*\left(i - \left\lfloor \frac{u}{N} \right\rfloor - 1\right) \cdot \frac{u \bmod N}{N}$$

In another embodiment, since the same values repeat in the next slot or TTI, the computation in formula (18) may be done in advance and stored in a look-up table for different value of $u_k(i)$.

Figure 4:
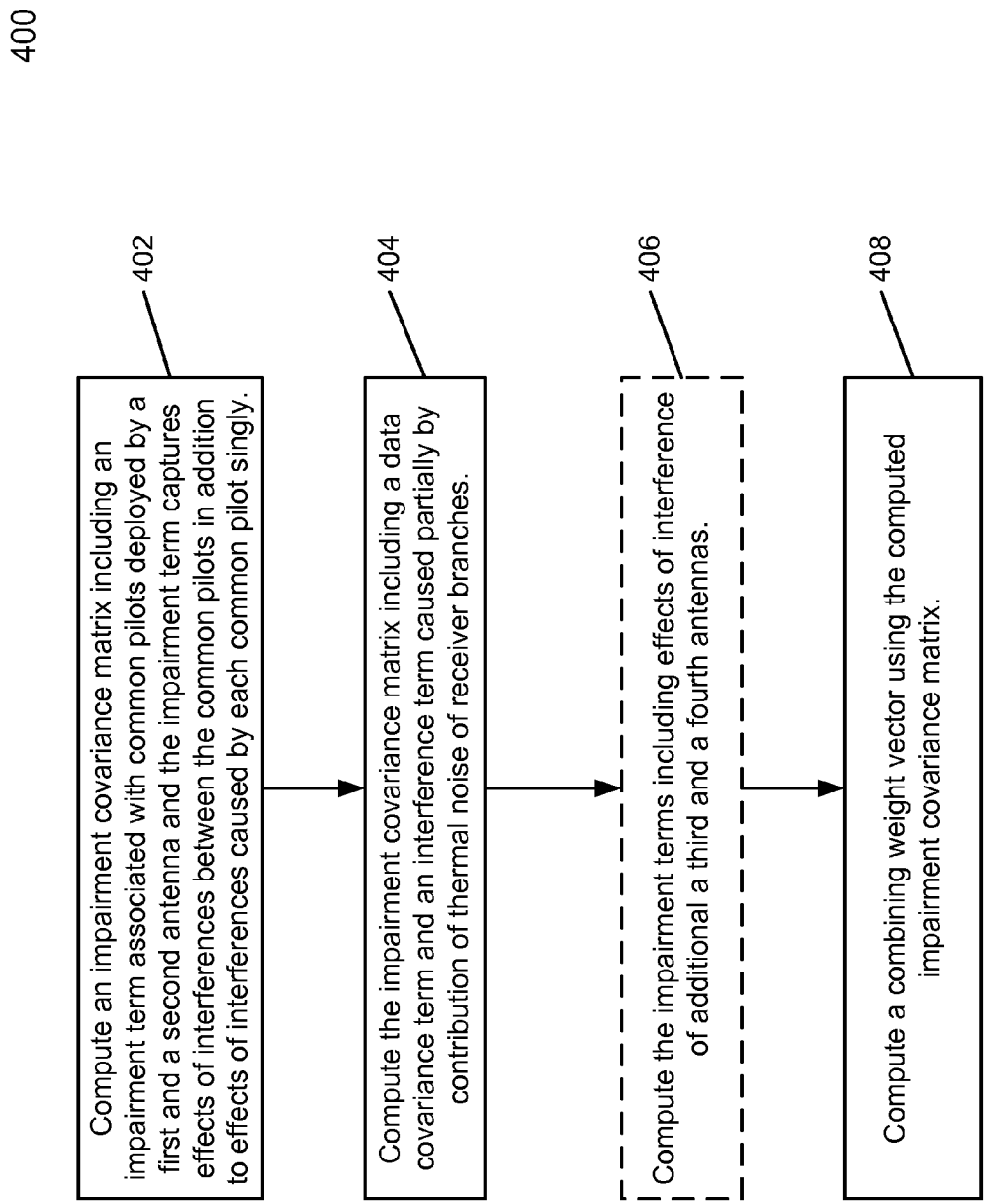
FIG. 4 is a block diagram illustrating a method of computing covariance matrix and a resulting combining weight vector taking into consideration the effects of the common pilot symbols according to one embodiment of the invention.

FIG. 4 is a block diagram illustrating a method of computing covariance matrix and a resulting combining weight vector exploring the knowledge of the common pilot symbols according to one embodiment of the invention. Method 400 may be performed in a MIMO system with at least two transmit antennas. It may be implemented in covariance estimation module 334 and combining weight vector computation module 342 as illustrated in FIG. 3.

Method 400 starts with computing an impairment covariance matrix at reference 402. The impairment covariance matrix includes an impairment term associated with common pilots deployed by at least two antennas respectively. In addition to capturing the effects of interference caused by each common pilot singly as known in the art, the impairment term further captures the effects of interference between the common pilots.

Onward to reference 404, the impairment covariance matrix further includes a data covariance term and an interference term caused at least partially by contribution of thermal noise of receiver branches. As discussed herein above, the data covariance term is defined in formula (15a) and may be computed using a code averaged expression such as formula (16). The interference term caused at least partially by contribution of thermal noise of receiver branches is defined as $R_n$ and its computation is known in the art.

Optionally, when the MIMO system contains more than two transmit antennas, the method may compute the impairment terms including effects of interference of additional antennas at reference 406. When the system has four transmit antennas, the interference of the third and fourth antennas is captured in this step. When the system has more than four transmit antennas, the interference of all additional antennas is captured, including interference between any two of the deployed antennas.

Finally, at reference 408, the method computes a combining weight vector using the computed impairment covariance matrix obtained through steps 402-406. The obtained combining weight vector is then used to demodulate the targeted data stream.

Thus, by including cross-interference between the common pilots, the impairment term captures the effects of interference of common pilots better than what is known in the art. The better estimation of impairment term may be deployed in a smaller MIMO system (e.g., a 2×2 MIMO) or a larger MIMO system (e.g., a 4×4 or a 8×8 MIMO system) alike.

Embodiments of Computing Interferences Caused by Dedicated Pilots

Referring back to formula (14), prior art has not considered effect of dedicated or scheduled common pilots. That is, the effect of $G_{m_1,m_2}^{(3)}(i)$ has been ignored so far. According to one embodiment of the invention, the effect of dedicated pilots can be modeled as follows. The $(n_1, n_2)^{th}$ entry of the $(l_1,l_2)^{th}$ block of $G_{m_1,m_2}^{(3)}(i)$ can be shown to be:

$$[G_{m_1,m_2}^{(3)}(i)]_{l_1,l_2,n_1,n_2} = \quad (19)$$

$$\frac{1}{N} \sum_{p_1=1}^{P} \sum_{p_2=1}^{P} g_{m_1,l_1,p_1} \cdot g_{m_2,l_2,p_2}^* \sum_{\substack{u=-\infty \\ u \neq 0}}^{\infty} v_{m_1,m_2}(u;i) \cdot$$

$$x(\tau_{n_1} - \tau_{m_1,l_1,p_1} - uT_c) \times x(\tau_{n_2} - \tau_{m_2,l_2,p_2} - uT_c).$$

In formula (19), $v_{m_1,m_2}(u;i)$ may be expressed as:

$$v_{m_1,m_2}(u;i) = u_{m_1}^T \cdot A_d \cdot [d(i-j) \cdot d(i-j)^H] \cdot A_d \cdot u_{m_2} \cdot \left(1 - \frac{u \bmod N}{N}\right) + \quad (20)$$

$$u_{m_1}^T \cdot A_d \cdot [d(i-j-1) \cdot d(i-j-1)^H] \cdot A_d \cdot u_{m_2} \cdot \frac{u \bmod N}{N}$$

In one embodiment, a simpler expression can be obtained for the function $v_{m_1,m_2}(u;i)$ by selectively choosing the channelization codes of the dedicated pilots. For example, if channelization codes $C_{ch,256,n+1}$ to $C_{ch,256,n+4}$ are allocated to the dedicated pilots, for any n divisible by 4, d(i) will always be a Hadamard vector. $U_H$ is defined to be a Hadamard matrix and $v_m$ to be:

$$v_m{}^H = u_m{}^T \cdot A_d \cdot U_H = [v^*_{m,1} v^*_{m,2} v^*_{m,3} v^*_{m,4}] \quad (21)$$

Then, the two coefficients in (20) are taken from $v^*_{m_1,1} \cdot v_{2_2,1}$, $v^*_{m_1,2} \cdot v_{m_2,2}$, $v^*_{m_1,3} \cdot v_{m_2,3}$ or $v^*_{m_1,4} \cdot v_{2_2,4}$. The function $v_{m_1,m_2}(u;i)$ is piecewise linear and the value of $v_{m_1,m_2}(u;i)$ at $u=kN$ is one of these four values. Again, $v_{m_1,m_2}(u;i)$ is periodic, similar to $f_{m_1,m_2}(u;i)$ of formula (17). Thus, for example, for every $$\frac{N_c = 256}{N = 16} = 16$$

symbols for the selected N and $N_c$, $G_{m_1,m_2}{}^{(3)}(i)$ may be computed for the first 16 symbols of every slot or every (several) TTIs only and stored for subsequent symbol intervals.

Figure 5:
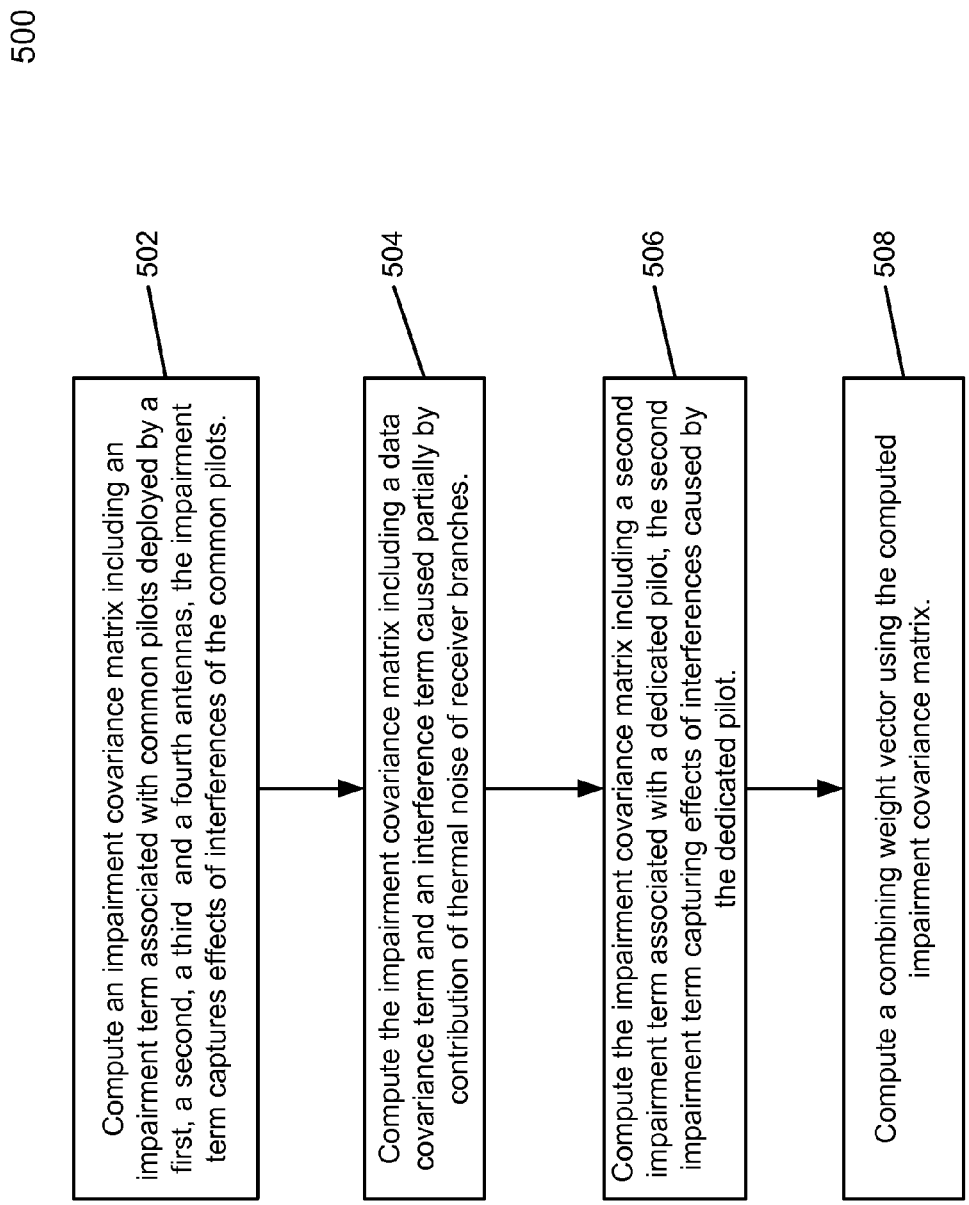
FIG. 5 is a block diagram illustrating a method of computing covariance matrix and a resulting combining weight vector taking into consideration of effects of dedicated pilots according to one embodiment of the invention.

FIG. 5 is a block diagram illustrating a method of computing covariance matrix and a resulting combining weight vector taking into consideration of effects of dedicated pilots according to one embodiment of the invention. Method 500 may be performed in a MIMO system with at least four transmit antennas where dedicated common pilots are deployed. It may be implemented in covariance estimation module 334 and combining weight vector computation module 342 as illustrated in FIG. 3. Method 500 is similar to method 400 in that references 502, 504, and 508 are similar to references 402, 404, and 408 of FIG. 4 respectively, thus only differences between the two methods are discussed below.

In method 500, reference 502 computes an impairment term associated with common pilots deployed by the transmit antennas (at least four of them). The impairment term captures effects of interferences of the deployed common pilots. In one embodiment, the impairment term captures effects of interferences between any two of the common pilots in addition to each common pilot singly. In another embodiment, the impairment term may capture none or only a portion of the interferences between any two of the common pilots. Also in method 500, reference 506 computes the impairment covariance matrix including a second impairment term associated with at least one dedicated pilot being deployed, and the second impairment term capturing effects of interferences caused by the dedicated pilot. In one embodiment, the second impairment term may be computed through formulas (19) to (21).

Embodiments of Computing Interferences Caused by Shared Common Pilots

Referring back to formula (14), prior art has not considered effects of scheduled common pilots. When scheduled common pilots are deployed, $G_{m_1,m_2}{}^{(3)}(i)$ will look exactly like (17) and (18) except that the common pilot symbols $p_m(i)$ will be replaced by the scheduled common pilot symbols $q_m(i)$ and the common pilot powers $\eta_m$ will be replaced by the diagonal entries of $A_s$. Thus, the $G_{m_1,m_2}{}^{(3)}(i)$ may be computed with replaced variables.

Figure 6:
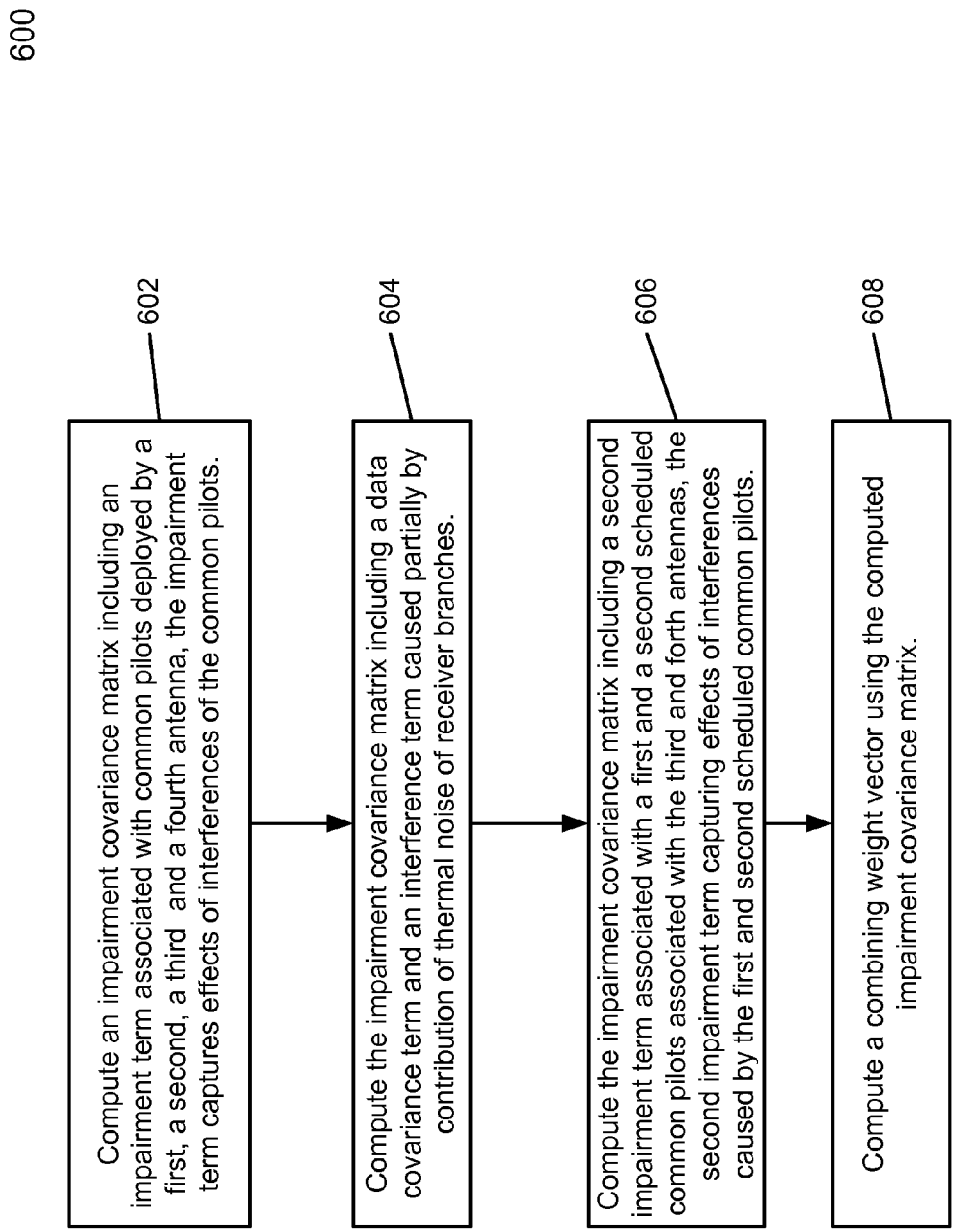
FIG. 6 is a block diagram illustrating a method of computing covariance matrix and a resulting combining weight vector taking into consideration of effects of shared common pilots according to an embodiment of the invention.

FIG. 6 is a block diagram illustrating a method of computing covariance matrix and a resulting combining weight vector taking into consideration of effects of shared common pilots according to an embodiment of the invention. Method 600 may be performed in a MIMO system with at least four transmit antennas and where additional shared common pilots are deployed. It may be implemented in covariance estimation module 334 and combining weight vector computation module 342 as illustrated in FIG. 3. Method 600 is similar to method 500 in that references 602, 604, and 608 are similar to references 502, 504, and 508 of FIG. 5 respectively, thus only differences between the two methods are discussed below.

As shared common pilots are deployed at least at the third and fourth transmit antennas respectively, reference 606 compute the impairment covariance matrix including a second term capturing effects of interferences caused by the shared common pilots. In one embodiment, reference 606 may apply the algorithm for $G_{m_1,m_2}{}^{(3)}(i)$ discussed herein above.

Embodiments of Computing Combining Weight Vectors

For a MIMO system, the computation of covariance matrix is used to obtain the combining weight vectors for various data stream. The channel response matrix in formula (1) may be defined as:

$$H_{eff} = H \cdot B \cdot A = [h_{eff}{}^{(1)} \ldots h_{eff}{}^{(M)}] \quad (22)$$

For a four-branch MIMO system, the combining weight vectors for data code k of streams one to four, $w_1$, $w_2$, $w_3$ and $w_4$ are obtained by solving the following set of linear equations:

$$(R_k(i) + h_{eff}{}^{(2)} \cdot h_{eff}{}^{(2)H} + h_{eff}{}^{(3)} \cdot h_{eff}{}^{(3)H} + h_{eff}{}^{(4)} \cdot h_{eff}{}^{(4)H}) \cdot w_1 = h_{eff}{}^{(1)} \quad (23a)$$

$$(R_k(i) + h_{eff}{}^{(1)} \cdot h_{eff}{}^{(1)H} + h_{eff}{}^{(3)} \cdot h_{eff}{}^{(3)H} + h_{eff}{}^{(4)} \cdot h_{eff}{}^{(4)H}) \cdot w_2 = h_{eff}{}^{(2)} \quad (23b)$$

$$(R_k(i) + h_{eff}{}^{(1)} \cdot h_{eff}{}^{(1)H} + h_{eff}{}^{(2)} \cdot h_{eff}{}^{(2)H} + h_{eff}{}^{(4)} \cdot h_{eff}{}^{(4)H}) \cdot w_3 = h_{eff}{}^{(3)} \quad (23c)$$

$$(R_k(i) + h_{eff}{}^{(1)} \cdot h_{eff}{}^{(1)H} + h_{eff}{}^{(2)} \cdot h_{eff}{}^{(2)H} + h_{eff}{}^{(3)} \cdot h_{eff}{}^{(3)H}) \cdot w_4 = h_{eff}{}^{(4)} \quad (23d)$$

Prior art has considered computing combining weight vectors for 2×2 MIMO systems. In this case, $H_{eff}$ had two columns only and there are two combining weight vectors to compute as shown in the following:

$$R_k(i) + h_{eff}{}^{(2)} \cdot h_{eff}{}^{(2)H}) \cdot w_1 = h_{eff}{}^{(1)} \quad (24a)$$

$$R_k(i) + h_{eff}{}^{(1)} \cdot h_{eff}{}^{(1)H}) \cdot w_2 = h_{eff}{}^{(2)} \quad (24b)$$

In U.S. Pat. No. 7,957,485, entitled "Reduced Complexity Parametric Covariance Estimation for Precoded MIMO Transmissions," by Douglas Cairns and Stephen Grant (hereinafter "Carins patent"), in order to solve the equations, it was proposed to first solve $R_k(i) \cdot v_1 = h_{eff}{}^{(1)}$ and $R_k(i) \cdot v_2 = h_{eff}{}^{(2)}$ then obtain $w_1$ and $w_2$ from $v_1$ and $v_2$ via the so-called rank-one updates (see formulas (26) and (27) in Carins patent). A rank of a matrix is the maximum number of linearly independent vectors of the matrix. If the proposed method is applied to an N×M MIMO system where N and M are larger than 2, the computation can be complicated. For example, for a 4-branch MIMO system, the method will solve four equations: $R_k(i) \cdot v_1 = h_{eff}{}^{(1)}$ to $R_k(i) \cdot v_4 = h_{eff}{}^{(4)}$ then obtain $w_1$ to $w_4$ from $v_1$ to $v_4$ via three rank-one updates.

Figure 7:
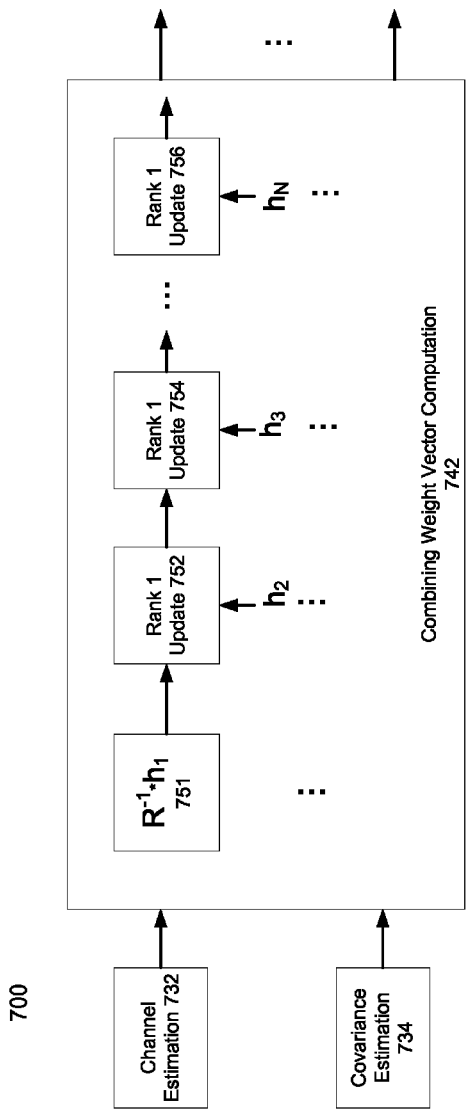
FIG. 7 is a block diagram illustrating a method of computing combining weight vectors through multiple rank-one updates in a MIMO system.

FIG. 7 is a block diagram illustrating a method of computing combining weight vectors through multiple rank-one updates in a MIMO system. The operations are performed within combining weight vector computation module 742. For a given $R^{-1}h$ (e.g., $R^{-1}h_1$ as shown in FIG. 7), it goes through N−1 rank-one updates, if the MIMO system contains N branches. As the computation is repeated for every branch of stream, the computation consumes significant computing resources.

Figure 8:
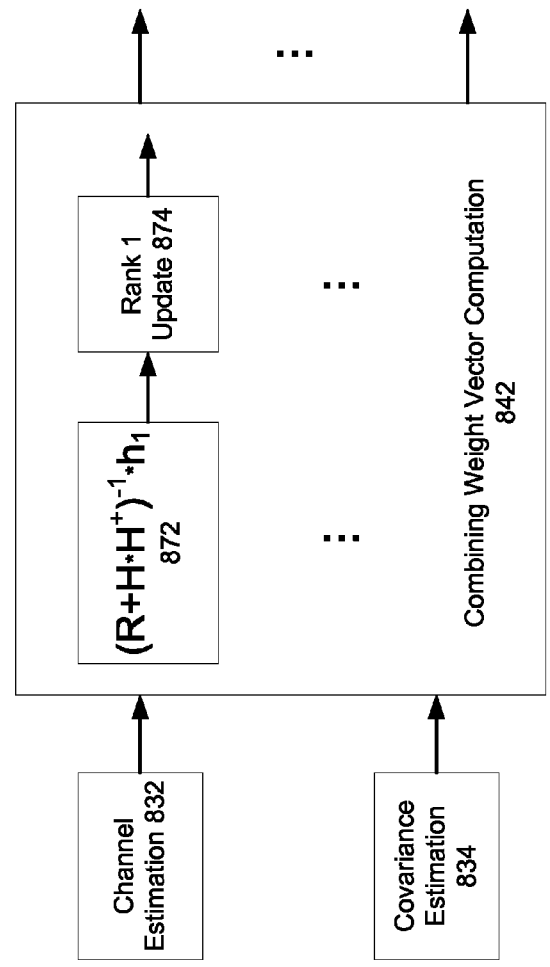
FIG. 8 is a block diagram illustrating a method of computing combining weight vectors through a rank-one update in a MIMO system according to an embodiment of the invention.

FIG. 8 is a block diagram illustrating a method of computing combining weight vectors through a rank-one update in a MIMO system according to an embodiment of the invention.

Similar to FIG. 7, the operations are performed within a combining weight vector computation module (referred to as 842 in FIG. 8). Unlike FIG. 7 through, for each stream, only a single rank-one update is required, thus the computation is simplified. The simplification is achieved through a different type of input to a rank-one update comparing to FIG. 7. Instead of $R^{-1}h$, the input to rank-one update is replaced with $(R+HH^H)^{-1}h$. For example, $(R+HH^H)^{-1}h_1$ is shown in FIG. 8 for the first stream). Note that the rank-one update applies to two-branch receiving system as well as four-branch or higher branch receiving systems.

In a mathematical form, for a four-branch MIMO system, the equations to solve would be the following according to an embodiment of the invention:

$$(R_k(i)+H_{eff} \cdot H_{eff}^H) \cdot v_1 = h_{eff}^{(1)} \quad (25a)$$

$$(R_k(i)+H_{eff} \cdot H_{eff}^H) \cdot v_2 = h_{eff}^{(2)} \quad (25b)$$

$$(R_k(i)+H_{eff} \cdot H_{eff}^H) \cdot v_3 = h_{eff}^{(3)} \quad (25c)$$

$$(R_k(i)+H_{eff} \cdot H_{eff}^H) \cdot v_4 = h_{eff}^{(4)} \quad (25d)$$

That is to say, the matrix of the four linear systems is $R_k(i)+H_{eff} \cdot H_{eff}^H$ instead of $R_k(i)$. Then the required combining weights are obtained from the following rank-one updates:

$$w_1 = \frac{1}{1 - h_{eff}^{(1)H} \cdot v_1} \cdot v_1 \quad (26a)$$

$$w_2 = \frac{1}{1 - h_{eff}^{(2)H} \cdot v_2} \cdot v_2 \quad (26b)$$

$$w_3 = \frac{1}{1 - h_{eff}^{(3)H} \cdot v_3} \cdot v_3 \quad (26c)$$

$$w_4 = \frac{1}{1 - h_{eff}^{(4)H} \cdot v_4} \cdot v_4 \quad (26d)$$

Figure 9:
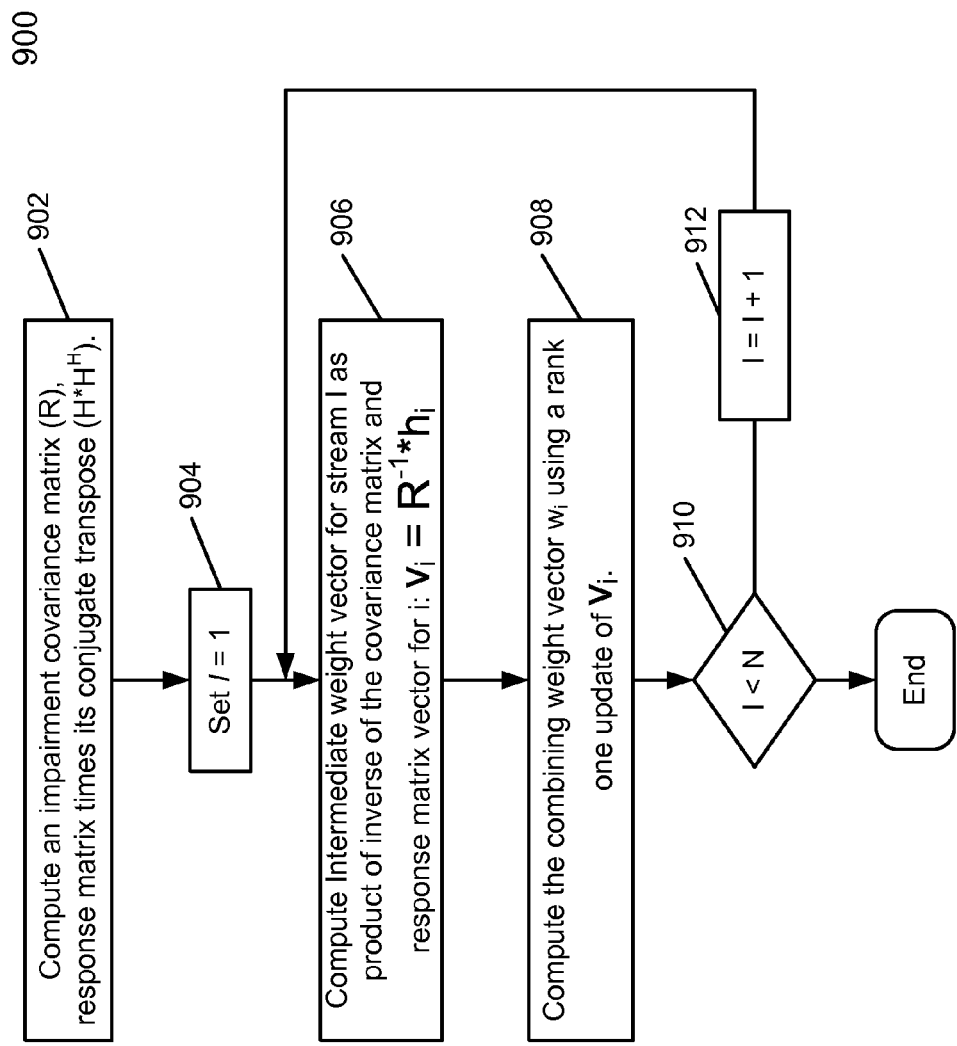
FIG. 9 is a flow diagram illustrating a method of computing combining weight vectors through a rank-one update in a MIMO system according to an embodiment of the invention.

FIG. 9 is a flow diagram illustrating a method of computing combining weight vectors through a rank-one update in a MIMO system according to an embodiment of the invention. Method 900 may be performed by combining weight vector computation module 342. The method starts at reference 902, where combining weight vector computation module 342 obtains an impairment covariance matrix R and the outer product of channel response matrix and its conjugate transpose for a N-branch MIMO system. An outer product of two vectors, as known by the skilled in the art, produces a matrix while an inner product of two vectors produces a scalar.

At reference 904, the method checks a stream identifier of the stream. Then at reference 906, an intermediate weight vector for the stream is computed. Then at reference 908, a rank-one update is applied to obtain the combining weight vector for the stream. The process iterates through each stream so that all N streams obtain their individual combining weight vectors.

Embodiments Utilizing Combinations of Inventions

The discussion above has disclosed several inventions regarding providing better and more efficiency parametric estimations for a G-Rake MIMO system. Two or more inventions may be integrated together in an embodiment of the invention.

Figure 10:
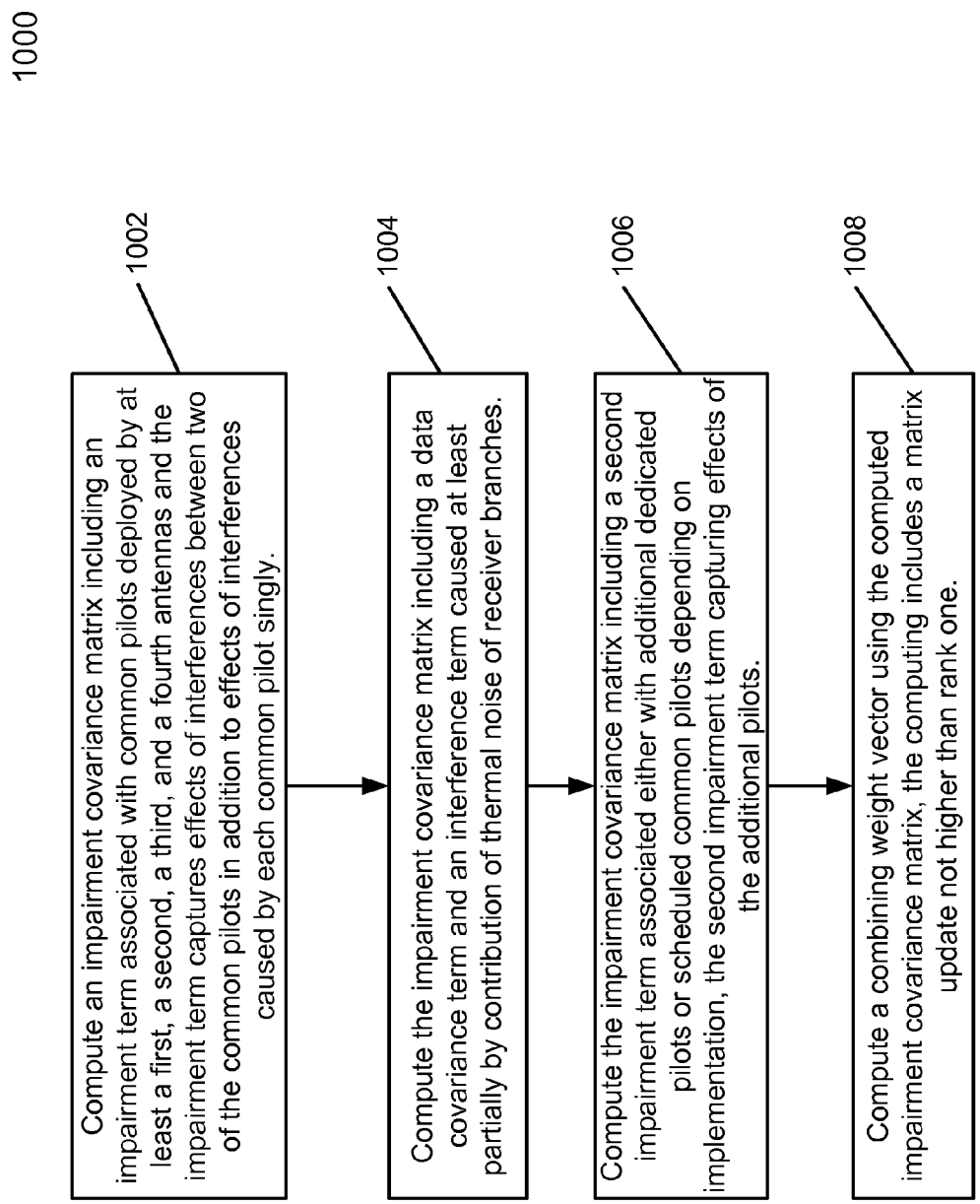
FIG. 10 is a flow diagram illustrating a method of computing combining weight vectors in a MIMO system according to an embodiment of the invention.

FIG. 10 is a flow diagram illustrating a method of computing combining weight vectors in a MIMO system according to an embodiment of the invention. Method 1000 may be implemented in a G-Rake receiver such as system 300 illustrated in FIG. 3. More specifically, method 1000 may be implemented in covariance estimation module 334 and combining weight vector computation module 342 of FIG. 3.

Referring to FIG. 10, method 1000 starts at reference 1002 with computing an impairment covariance matrix including an impairment term associated with common pilots deployed by at least a first, second, third, and fourth antennas. The impairment term captures effects of interferences between two of the common pilots in addition to effects of interferences caused by each common pilot singly. The effects of interferences between two of the common pilots may include all permutations of deployed common pilots in one embodiment. In another embodiment, the effects may include only a portion of all possible permutations.

Then at reference 1004, the method computes the impairment covariance matrix including a data covariance term and an interference term caused partially by contribution of thermal noise of propagation.

Onward to reference 1006, the method computes the impairment covariance matrix including a second impairment term associated with either additional dedicated pilots or scheduled common pilots depending on implementation, and the second impairment term capturing effects of the additional pilots. Generally either dedicated pilots or scheduled common pilots are deployed in a given system, and they do not deploy concurrently in a single system. Thus, depending on what has been deployed, the second impairment term captures the interference caused by the additional pilots.

Finally at reference 1008, the method computes a combining weight vector using the computed impairment covariance matrix in the earlier steps. The computing includes a matrix update not higher than rank-one for one stream. In one embodiment, the singly rank-one update is implemented similarly to what is illustrated in FIG. 8.

Different embodiments of the invention may be implemented using different combinations of software, firmware, and/or hardware. Thus, the techniques shown in the figures can be implemented using code and data stored and executed on one or more electronic devices (e.g., an end system, a network element). Such electronic devices store and communicate (internally and/or with other electronic devices over a network) code and data using machine-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device.

While the flow diagrams in the figures herein above show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method of calculating combining weight vectors associated with a received composite information signal comprising at least one data stream transmitted from at least a first antenna and a second antenna, a calculated combining weight vector being used to demodulate the at least one data stream transmitted through a transmission channel, the method comprising:

computing a parametric estimate of an impairment covariance matrix including at least a first impairment term associated with common pilots deployed by the first antenna and the second antenna respectively, wherein the common pilots are pilots without being precoded or beam-formed, wherein the first impairment term captures effects of interferences between the common pilots, in addition to effects of interferences caused by each common pilot singly, and wherein the computed impairment covariance matrix further includes a data covariance term capturing effects of the at least one data stream and an interference term caused at least partially by contribution of thermal noise of receiver branches; and computing the combining weight vector using the computed impairment covariance matrix.

2. The method of claim 1, wherein the first impairment term caused by the common pilots uses a scale function calculated in advance so that the calculating of the first impairment term includes retrieving the calculated scale function, and wherein the scale function depends on pilot sequences used on the first antenna and the second antenna.

3. The method of claim 1, wherein the at least one data stream is transmitted from a third antenna and a fourth antenna in addition to the first antenna and the second antenna, wherein the additional third and fourth antenna deploy additional common pilots, and wherein the first impairment term captures effects of interferences of a pair between two of the four common pilots.

4. The method of claim 3, wherein the additional third and fourth antennas further deploy additional scheduled common pilots, the additional scheduled common pilots being deployed only when the at least one data stream is scheduled to be transmitted to a user equipment (UE) supporting demodulation of signals on the additional third and fourth antennas, and wherein the impairment covariance matrix includes a second impairment term capturing effects of interferences caused by the additional scheduled common pilots.

5. The method of claim 3, wherein the additional third and fourth antennas further deploy at least one additional dedicated pilot, wherein the at least one additional dedicated pilot is a pilot being precoded or beam-formed, and wherein the impairment covariance matrix including a second impairment term captures effects of interferences caused by the at least one additional dedicated pilot.

6. The method of claim 1, wherein computing the combining weight vector involves one or more rank-one update.

7. A network device configured to perform as a wireless communication receiver in a network, comprising:

a radio front-end circuit configured to receive a composite information signal, the composite information signal comprising at least one data stream transmitted from at least a first antenna and a second antenna;

a covariance estimation module configured to compute a parametric estimate of an impairment covariance matrix including at least a first impairment term associated with common pilots deployed by the first antenna and the second antenna respectively, wherein the common pilots are pilots without being precoded or beam-formed, wherein the first impairment term capture effects of interferences between the common pilots, in addition to effects of interferences caused by each common pilot singly, and wherein the computed impairment covariance matrix further includes a data covariance term capturing effects of the at least one data stream and an interference term caused at least partially by contribution of thermal noise of receiver branches; and a combining weight vector computation module configured to compute a combining weight vector using the computed impairment covariance matrix.

8. The network device of claim 7, wherein the first impairment term caused by the common pilots uses a scale function calculated in advance so that the calculating of the impairment term includes retrieving the calculated scale function, and wherein the scale function depends on pilot sequences used on the first antenna and the second antenna.

9. The network device of claim 7, wherein the at least one data stream is transmitted from a third antenna and a fourth antenna in addition to the first antenna and the second antenna, wherein the additional third and fourth antenna deploy additional common pilots, and wherein the first impairment term captures effects of interferences of a pair between two of the four common pilots.

10. The network device of claim 9, wherein the additional third and fourth antennas further deploy additional scheduled common pilots, the additional scheduled common pilots being deployed only when the at least one data stream is scheduled to be transmitted to a user equipment (UE) supporting demodulation of signals on the additional third and fourth antennas, and wherein the impairment covariance matrix includes a second impairment term capturing effects of interferences caused by the additional scheduled common pilots.

11. The network device of claim 9, wherein the additional third and fourth antennas further deploy at least one additional dedicated pilot, wherein the at least one additional dedicated pilot is a pilot being precoded or beam-formed, and wherein the impairment covariance matrix including a second impairment term captures effects of interferences caused by the at least one additional dedicated pilot.

12. The network device of claim 7, wherein computing the combining weight vector involves one or more rank-one update.

13. A method of calculating combining weight vectors associated with a received composite information signal comprising at least one data stream transmitted from at least a first antenna, a second antenna, a third antenna, and a fourth antenna, a calculated combining weight vector being used to demodulate the at least one data stream transmitted through a transmission channel, the method comprising:

compute a parametric estimate of an impairment covariance matrix including at least a first impairment term associated with common pilots deployed by the first antenna, the second antenna, the third antenna, and the fourth antenna respectively, wherein the common pilots are pilots without being precoded or beam-formed, wherein the first impairment term captures effects of interferences between the common pilots, in addition to effects of interferences caused by each common pilot singly, wherein the computed impairment covariance matrix further includes a data covariance term capturing effects of the at least one data stream and an interference term caused at least partially by contribution of thermal noise of receiver branches, and wherein the computed impairment covariance matrix further includes a second impairment term associated with one of at least one dedicated pilot, wherein the dedicated pilots are pilots being precoded or beam-formed, and wherein the second impairment term captures effects of interferences caused by the at least one dedicated pilots; and at least a first scheduled common pilot and a second scheduled common pilot associated with the third antenna and the fourth antenna respectively, wherein the additional scheduled common pilots being deployed only when the at least one data stream is scheduled to be transmitted to a user equipment (UE) supporting demodulation of signals on at least the additional third and fourth antenna, and wherein the second impairment term captures effects of interferences caused by the additional scheduled common pilots;

and computing a combining weight vector using the computed impairment covariance matrix, wherein computing the combining weight vector includes a matrix update no higher than rank-one.

14. A wireless communication receiver, comprising:

a radio front-end circuit configured to receive a composite information signal, the composite information signal comprising at least one data stream transmitted from at least a first antenna, a second antenna, a third antenna, and a fourth antenna;

a covariance estimation module configured to compute a parametric estimate of an impairment covariance matrix including at least a first impairment term associated with common pilots deployed by the first antenna, the second antenna, the third antenna, and the fourth antenna respectively, wherein the common pilots are pilots without being precoded or beam-formed, wherein the first impairment term captures effects of interferences between the common pilots, in addition to effects of interferences caused by each common pilot singly, wherein the computed impairment covariance matrix further includes a data covariance term capturing effects of the at least one data stream and an interference term caused at least partially by contribution of thermal noise of receiver branches and wherein the computed impairment covariance matrix further includes a second impairment term associated with one of at least one dedicated pilot, wherein the dedicated pilots are pilots being precoded or beam-formed, and wherein the second impairment term captures effects of interferences caused by the at least one dedicated pilots; and at least a first scheduled common pilot and a second scheduled common pilot associated with the third antenna and the fourth antenna respectively, wherein the additional scheduled common pilots being deployed only when the at least one data stream is scheduled to be transmitted to a user equipment (UE) supporting demodulation of signals on at least the additional third and fourth antenna, and wherein the second impairment term captures effects of interferences caused by the additional scheduled common pilots;

and a combining weight vector computation module configured to compute a combining weight vector using the computed impairment covariance matrix, wherein computing the combining weight vector includes a matrix update no higher than rank-one.

\* \* \* \* \*

UNITED STATES PATENT AND TRADEMARK OFFICE
CERTIFICATE OF CORRECTION

PATENT NO. : 8,976,885 B2
APPLICATION NO. : 13/747442
DATED : March 10, 2015
INVENTOR(S) : Bebawy et al.

It is certified that error appears in the above-identified patent and that said Letters Patent is hereby corrected as shown below:

In the Specification

In Column 9, Line 9, delete "multcode k. His" and insert -- multicode k. H is --, therefor.

In Column 15, Line 10, delete " $V_{2_2,1} \cdot V^*_{m_1,2} \cdot V_{m_2,2}, V^*_{m_1,3} \cdot V_{m_2,3}$ or $V^*_{m_1,4} \cdot V_{2_2,4} \cdot$ " and insert -- $V^*_{m_1,1} \cdot V_{m_2,1}, V^*_{m_1,2} \cdot V_{m_2,2}, V^*_{m_1,3} \cdot V_{m_2,3}$ or $V^*_{m_1,4} \cdot V_{m_2,4} \cdot$ --, therefor.

Signed and Sealed this
Twenty-seventh Day of October, 2015

Michelle K. Lee
*Director of the United States Patent and Trademark Office*